W. A. AND E. J. GRIFFITHS.
AUTOMOBILE TIRE.
APPLICATION FILED DEC. 20, 1919.
1,348,871.  Patented Aug. 10, 1920.
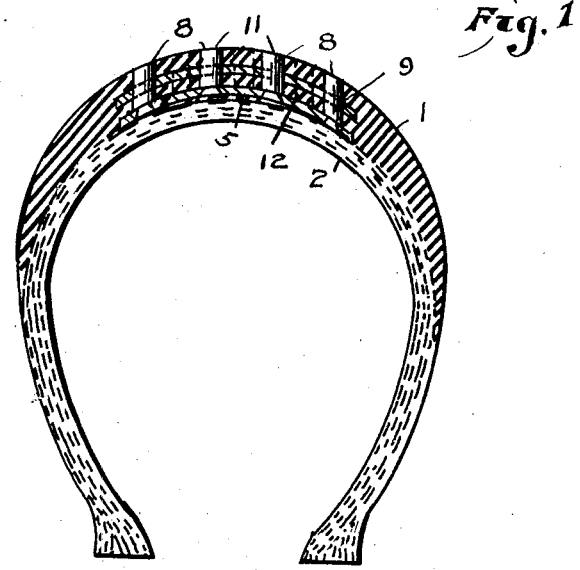
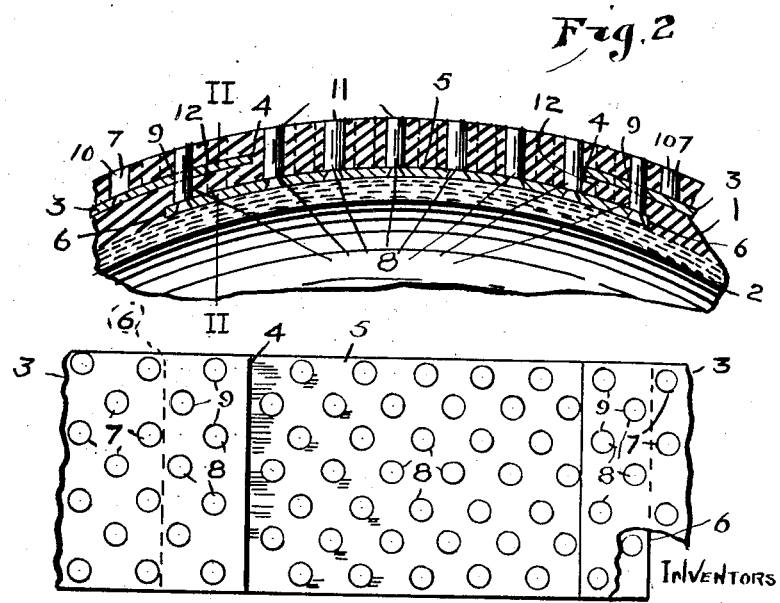

UNITED STATES PATENT OFFICE.

WILLIAM A. GRIFFITHS AND EDWARD J. GRIFFITHS, OF HOMESTEAD, PENNSYLVANIA.

AUTOMOBILE-TIRE.

1,348,871.   Specification of Letters Patent.   Patented Aug. 10, 1920.

Application filed December 20, 1919. Serial No. 346,315.

*To all whom it may concern:*

Be it known that we, WILLIAM A. GRIFFITHS and EDWARD J. GRIFFITHS, citizens of the United States, residing at Homestead, in the county of Allegheny and State of Pennsylvania, have invented certain new and useful Improvements in Automobile-Tires, of which the following is a specification.

This invention relates to improvements in automobile tires, particularly pneumatic tires, and the primary object thereof is to provide a tire of the character described, in a manner as hereinafter set forth, whereby the area of the tire most liable to puncture is fully protected and providing means for lengthening the life of the tire without detracting from its resiliency.

Further objects of the invention are to provide a tire of the type stated which is simple in its construction and arrangement, strong, durable and efficient in its use, and comparatively inexpensive to manufacture.

To the accomplishment of these and such other objects as may hereinafter appear the invention consists of the novel construction, combination and arrangement of parts herein specifically described and illustrated in the accompanying drawing wherein is shown an embodiment of the invention, but it is to be understood that changes, variations and modifications in the construction may be resorted to which come within the scope of the claims hereunto appended.

In the drawing forming a portion of this specification and wherein like numerals of reference designate corresponding parts throughout the several views:

Figure 1 is a cross sectional view of a pneumatic tire in accordance with this invention on line I—I, Fig. 2.

Fig. 2 is a sectional side view of a portion of a tire.

Fig. 3 is a fragmentary top plan view of the reinforcing members.

Referring to the drawing in detail there is shown in Fig. 1 a transverse sectional view of a pneumatic tire constructed in accordance with this invention, and comprising the tread 1, ordinarily made from rubber and formed integrally with the usual fabric laminæ carcass 2.

Embedded in the tread 1 of the tire are a plurality of segmental plates 3 made preferably from sheet metal or other suitable puncture-proof materials. The plates 3 are curved longitudinally and also transversely to conform to the curvature of the body of the tread 1 in which it is embedded. The plates 3 are so positioned in the tread 1 of the tire as to leave a regular intervening space between the ends 4 of each, as clearly shown in Fig. 2, of the drawing.

Embedded intermediate of the tread 1 and the fabric carcass 2 of the tire, are a plurality of segmental plates 5 made preferably of the same materials and curvatures as the plates 3. The plates 5 are so positioned in the tire as to be in staggered relation with respect to the plates 3, that is, the former extend along the intervening space between the ends 4 of the latter, and in a manner to allow the ends 4 of the plates 3 to slightly overlap the ends 6 of the plates 5.

Each of the segmental plates 3 is provided with a plurality of radially disposed and outwardly extending transverse rows of short studs 7, and each of the plates 5 carries a plurality of radially disposed and outwardly extending transverse rows of long studs 8. The outer rows of long studs 8 carried by the ends 6 of each of the plates 5 pass through and are engaged in the ends 4 of each of the plates 3, as at 9, and connect the plates 3 and 5 together. The outer ends 10 and 11 of respective studs 7 and 8 protrude through the tread 1 and are shaped to conform to the curvature of and are flush with the periphery of the tread 1.

Plates 3 extending circumferentially around the tire at a radius greater than that of the plates 5, the body of the tread 1 will be bound together through the spaces 12 intervening between the ends 4 and 6 of the plates 3 and 5 respectively, and further prevent liability of circumferential movement of the said plates with the tire during the operation of the tire.

A tire of our improved construction is absolutely puncture-proof, and owing to the action of the studs 7 and 8 the life of the tread 1 is greatly prolonged.

What we claim is:

1. The combination with the tread portion of a tire, an outer set of segment shaped plates arranged in spaced relation and embedded in said tread portion, said set of plates arranged in a concentric row an inner set of segment shaped plates arranged in spaced relation and embedded in said tread portion inwardly with respect to and spaced from the plates of the outer set of plates, said inner set of plates arranged in a concentric row the plates of the outer set overlapping the plates of the inner set, transverse rows of studs carried by said plates and flush with the periphery of the said tread portion, the outer transverse rows of studs carried by the inner plates extending through the ends of the outer plates and coupling the two sets of plates together.

2. The combination with the tread portion of a tire, an outer set of plates arranged in spaced relation and embedded in the tread portion, said set of plates arranged in a concentric row an inner set of plates arranged in spaced relation and embedded in said tire, said set of plates arranged in a concentric row said inner set of plates being staggered with respect to the outer set of plates, transverse rows of studs carried by the said plates and flush with the periphery of the said tread portion, the studs of said inner plates being of greater length than the studs of the outer set of plates, the outer rows of studs of the inner plates connected to the outer plates for coupling the two sets of plates together.

In testimony whereof we affix our signatures.

WILLIAM A. GRIFFITHS.
EDWARD J. GRIFFITHS.